United States Patent [19]

Brusasco

[11] Patent Number: 5,005,436
[45] Date of Patent: Apr. 9, 1991

[54] RECIRCULATING BALL SCREW-NUT SCREW COUPLING

[75] Inventor: Enzo Brusasco, Torino, Italy

[73] Assignee: R.G.B. S.p.A., Turin, Italy

[21] Appl. No.: 308,825

[22] Filed: Feb. 10, 1989

[30] Foreign Application Priority Data

Feb. 11, 1988 [IT] Italy ................... 67099 A/88

[51] Int. Cl.⁵ ............................................. F16H 25/22
[52] U.S. Cl. ................................. 74/459; 74/424.8 R
[58] Field of Search ........................... 74/424.8 R, 459

[56] References Cited

U.S. PATENT DOCUMENTS

| | | | |
|---|---|---|---|
| 2,851,897 | 9/1958 | Cochrane | 74/459 |
| 2,855,792 | 10/1958 | Gates | 74/459 |
| 3,143,896 | 8/1964 | Edwards | 74/459 |
| 3,306,124 | 2/1967 | Adams | 74/459 |
| 4,750,378 | 6/1988 | Sheppard | 74/424.8 R |

FOREIGN PATENT DOCUMENTS

| | | | |
|---|---|---|---|
| 103316 | 3/1984 | European Pat. Off. | 74/459 |
| 610205 | 10/1948 | United Kingdom . | |
| 1257312 | 12/1971 | United Kingdom . | |
| 1413406 | 11/1975 | United Kingdom . | |

*Primary Examiner*—Peter R. Brown
*Attorney, Agent, or Firm*—Shlesinger & Myers

[57] ABSTRACT

A recirculating ball screw-nut screw coupling wherein the nut screw is defined by a cylindrical body having an internal helical groove for a number of balls located between the screw and nut screw, and two substantially radial holes each larger in diameter than the helical groove and each engaged by a plug having a hole facing the aforementioned groove; both plugs being connected integral with the opposite ends of a U-shaped fastener fitted on to the outside of the nut screw and having an internal recirculating channel connecting the holes in the plugs to each other, as well as externally via a radial loading hole.

15 Claims, 9 Drawing Sheets

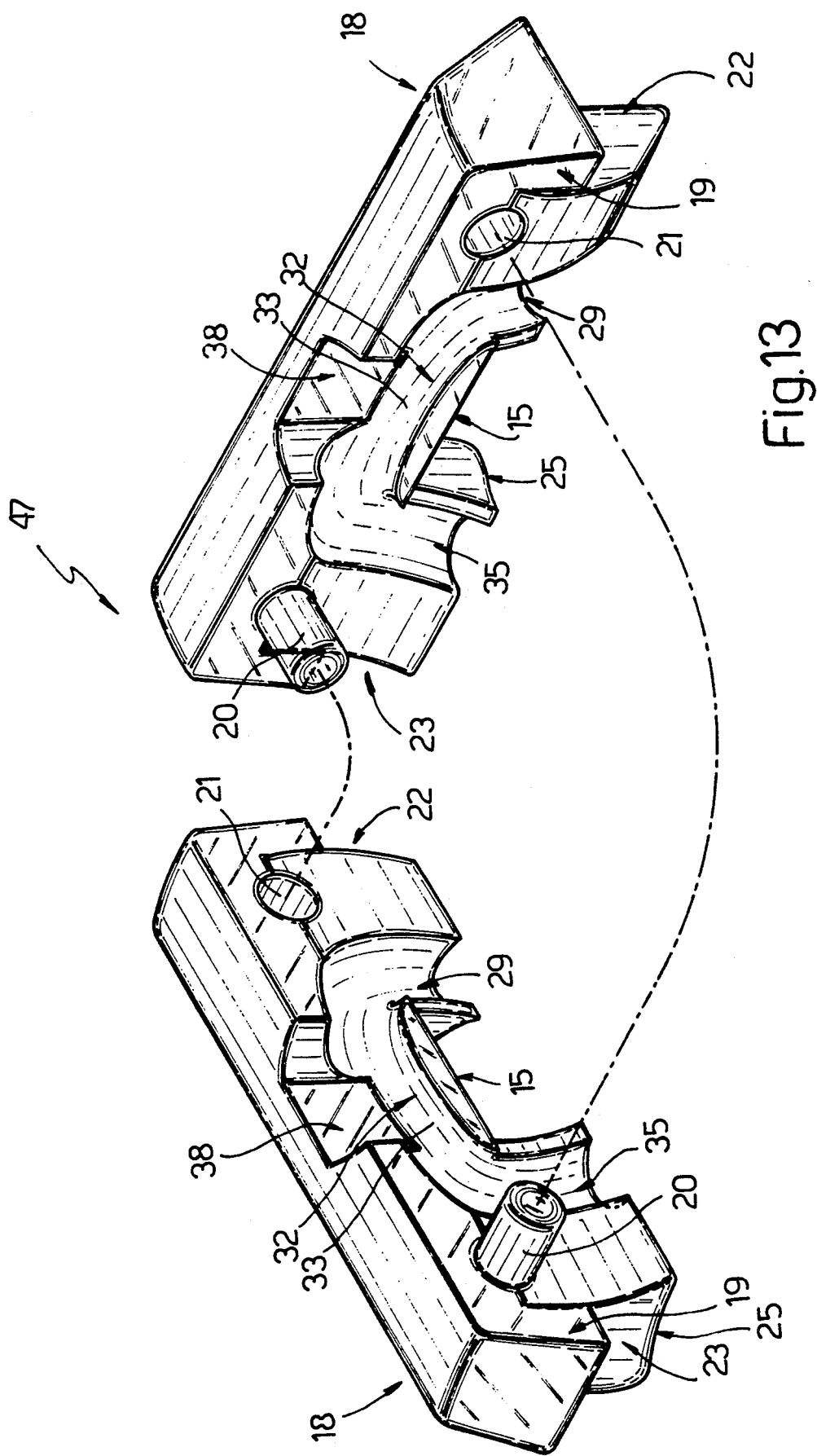

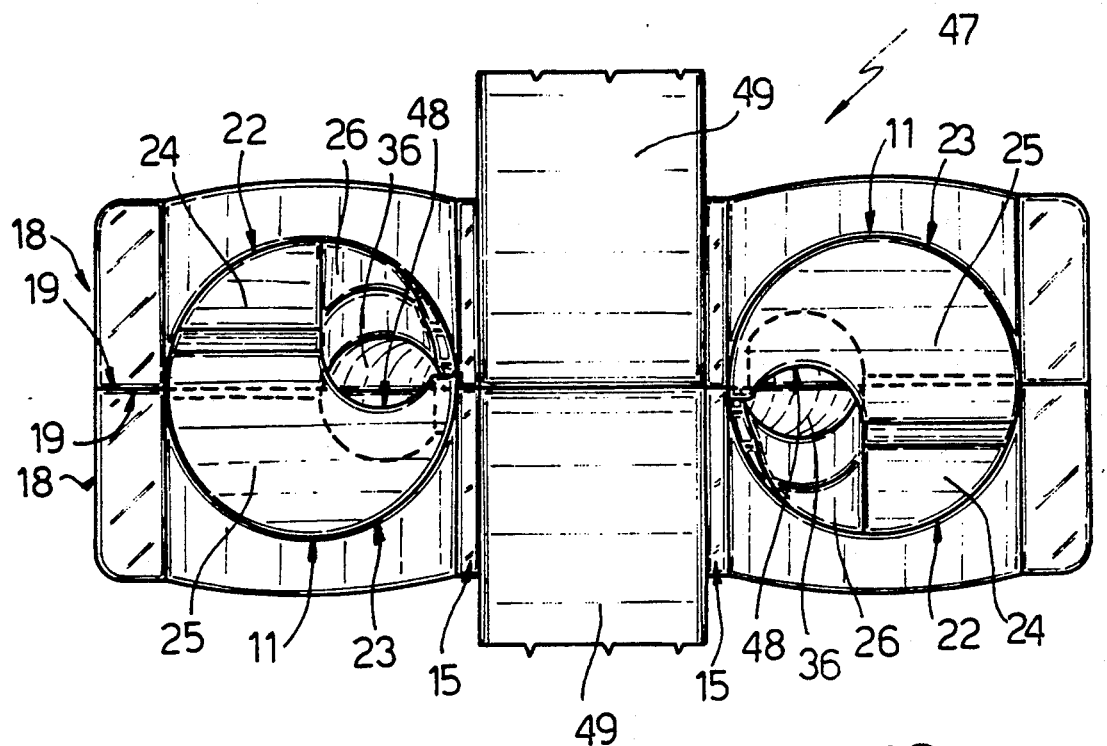
Fig.16
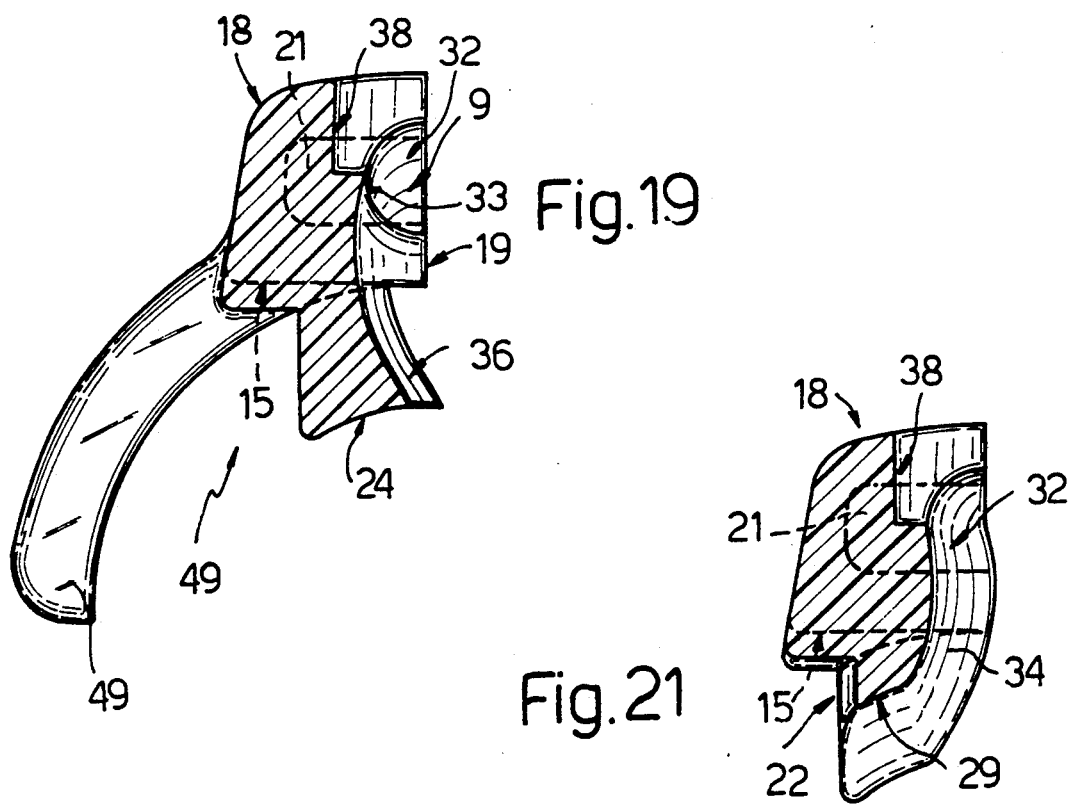
Fig.19
Fig.21

RECIRCULATING BALL SCREW-NUT SCREW COUPLING

BACKGROUND OF THE INVENTION

The present invention relates to a recirculating ball screw-nut screw coupling.

On known couplings of the aforementioned type, the nut screw is usually defined by a cylindrical body having an internal helical groove for a number of balls located between the screw and nut screw and arranged side by side along a given portion of said groove, and along a recirculating channel extending between two given points of the same.

On a first known type of screw-nut screw coupling, the recirculating channel extends outside the nut screw, each end being defined by a respective hole substantially transverse in relation to the nut screw axis and formed through the nut screw at a given point on the helical groove and substantially tangent to the same, thus enabling the balls to roll along the helical groove, into the inlet hole on the recirculating channel, and back through the outlet hole on the same to the start of the helical groove. This type of coupling undoubtedly presents excellent mechanical characteristics, by virtue of the inlet and outlet holes on the recirculating channel being perfectly aligned with the respective ends of the helical channel, thus blending the groove perfectly with the recirculating channel and substantially eliminating any possiblity of the balls gripping. Moreover, as any number of turns on the helical groove may be provided between the opposite ends of the recirculating channel, known couplings of this type may readily be designed to withstand any axial load compatible with the mechanical strength of the screw and nut screw.

Unfortunately, the relatively high manufacturing cost of couplings of this sort rules out any possibility of their being employed on widely used mass produced products, due to the transverse holes tangent to the helical groove inside the nut screw requiring extremely high precision machining, specially designed facilities, and a relatively thick nut screw.

To overcome the economic shortcomings of the above type of coupling, a second type has been devised wherein the recirculating channel is located inside the nut screw, and extends between two adjacent turns of the helical groove. On this type of coupling, the nut screw presents at least one radial hole (usually two) having a diameter equal to roughly twice the width of the internal helical groove, and located so as to involve two adjacent turns of the same. Said radial hole is normally engaged by a plug, usually made of plastic, and the inner end of which presents a groove portion blending with said two adjacent turns. In actual use, the balls roll about the screw, in contact with one another, along the turn extending between the opposite ends of the groove portion formed on the plug, then along the blend portion itself, and back to the start of the respective turn.

The economic advantages of this type of coupling as compared with the first obviously derive from the simplicity with which the radial hole is formed through the nut screw, and the fact that the cylindrical body of the nut screw itself may be extremely thin and formed, for example, from rolled sheet metal.

Though decidely cheaper to produce than the first, this type of coupling provides for relatively poor resistance to axial loads, by virtue of usually presenting only two holes and two rolling turns (one for each hole).

SUMMARY OF THE INVENTION

The aim of the present invention is to provide a recirculating ball screw-nut screw coupling designed to combine the advantages, while at the same time overcoming the drawbacks, of the aforementioned known types of coupling.

A further aim of the present invention is to provide a perfected screw-nut screw coupling involving straightforward, low-cost improvements to the second type of coupling described above, but with no substantial change in the nut screw itself.

With this aim in view, according to the present invention, there is provided a recirculating ball screw-nut screw coupling comprising a screw; a first helical groove formed on the outer surface of said screw; a nut screw coaxial with said screw; a second helical groove formed on the inner surface of said nut screw; a number of balls mounted between said screw and said nut screw, in such a manner as to roll along a path comprising a helical track defined by respective portions of said two helical grooves, and a recirculating channel extending outside said nut screw, between the opposite ends of said helical track; said nut screw presenting at least a pair of substantially radial holes, each larger in diameter than said helical track, and each engaged by a plug; characterised by the fact that each said plug presents a further respective through hole communicating with said helical track; a U-shaped fastener being provided outside said nut screw for connecting said two plugs, said recirculating channel extending along said U-shaped fastener, and said two further holes constituting opposite end portions of said recirculating channel.

BRIEF DESCRIPTION OF THE DRAWINGS

A number of non-limiting embodiments of the present invention will be described by way of examples with reference to the accompanying drawings, in which:

FIG. 13 shows an exploded view in perspective of a detail in FIG. 12;

FIG. 16 shows a bottom plan view of the FIG. 12 detail;

FIGS. 18, 19, 20, 21 and 22 show respective sections along lines XVIII—XVIII, XIX—XIX, XX—XX, XXI—XXI and XXII—XXII in FIG. 14.

DETAILED DESCRIPTION OF THE INVENTION

Figure 10:
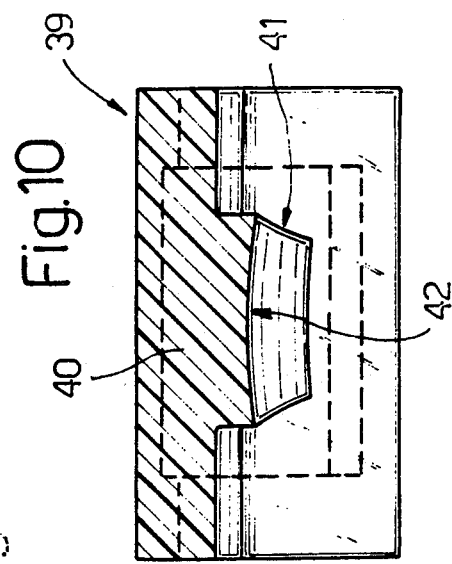
FIG. 10 shows a section along line X—X in FIG. 9.
Figure 9:
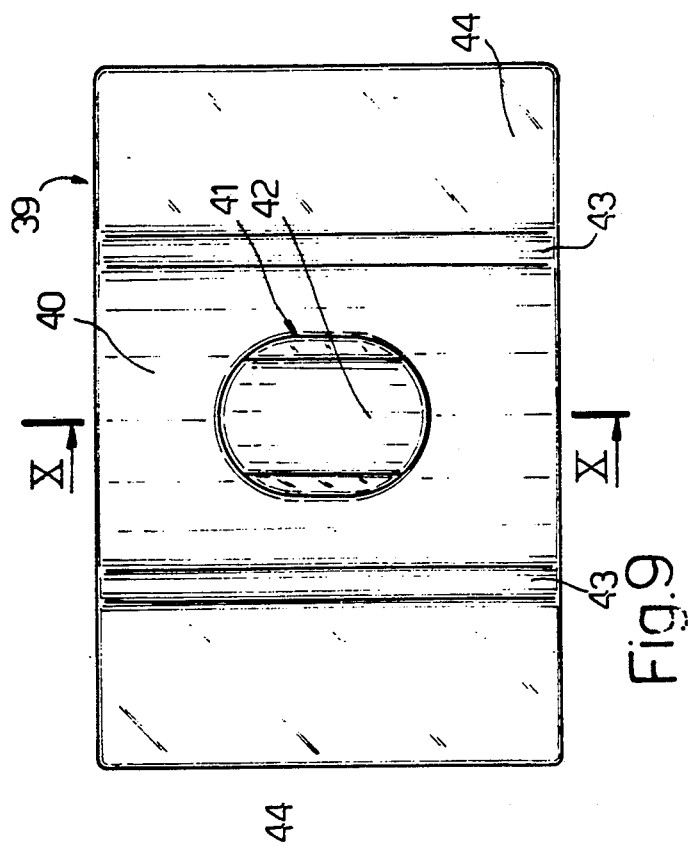
FIG. 9 shows a plan view of a detail in FIG. 1.

Number 1 in FIGS. 1 to 10 indicates a recirculating ball screw-nut screw coupling comprising a screw 2 having an external helical groove 3 and extending through a center hole 4 in a cylindrical nut screw 5 coaxial with screw 2 and having a second internal helical groove 6. Coupling 1 also comprises a number of balls 7 mounted between screw 2 and nut screw 5, in such a manner as to roll along a path comprising a helical track 8 defined by respective portions of helical grooves 3 and 6, and a recirculating channel 9 extending outside nut screw 5, between the opposite ends of helical track 8.

Figure 1:
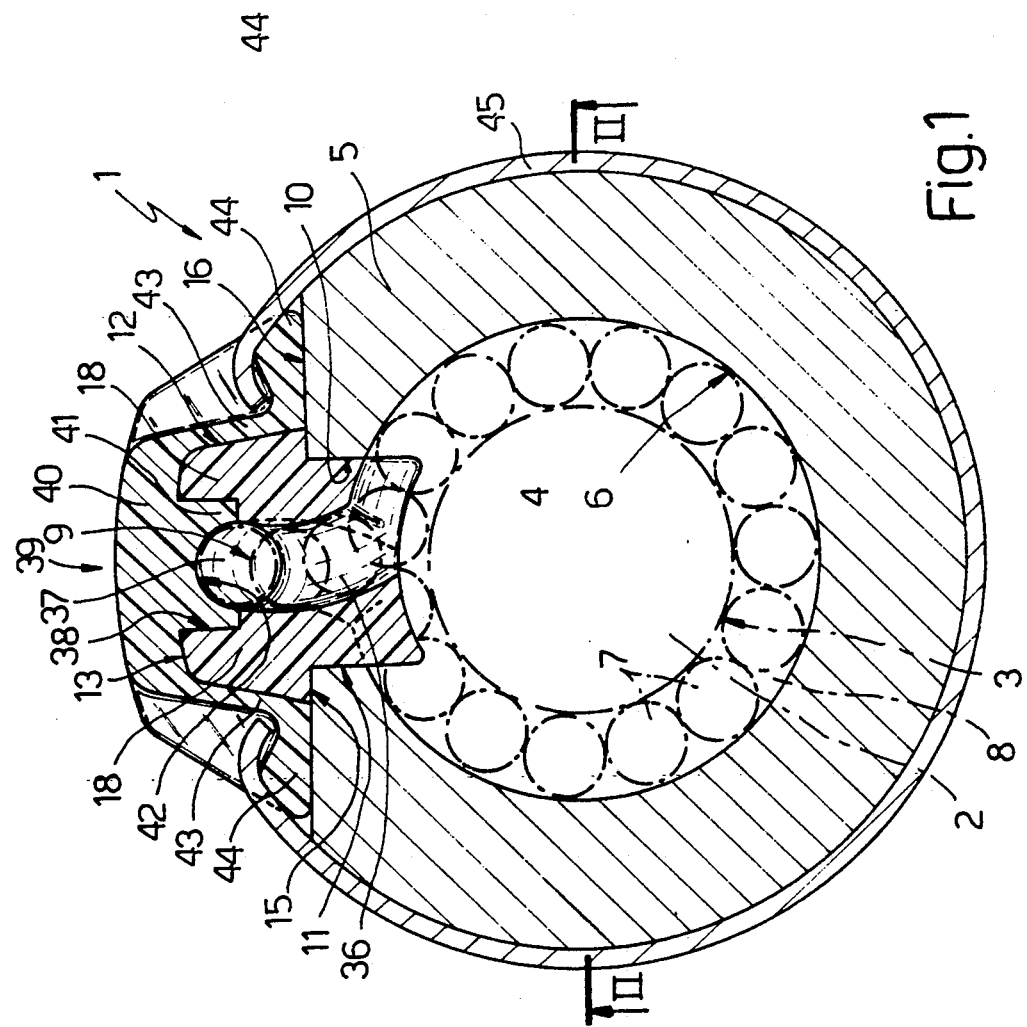
FIG. 1 shows a cross section of a first embodiment of the screw-nut screw coupling according to the present invention.
Figure 11:
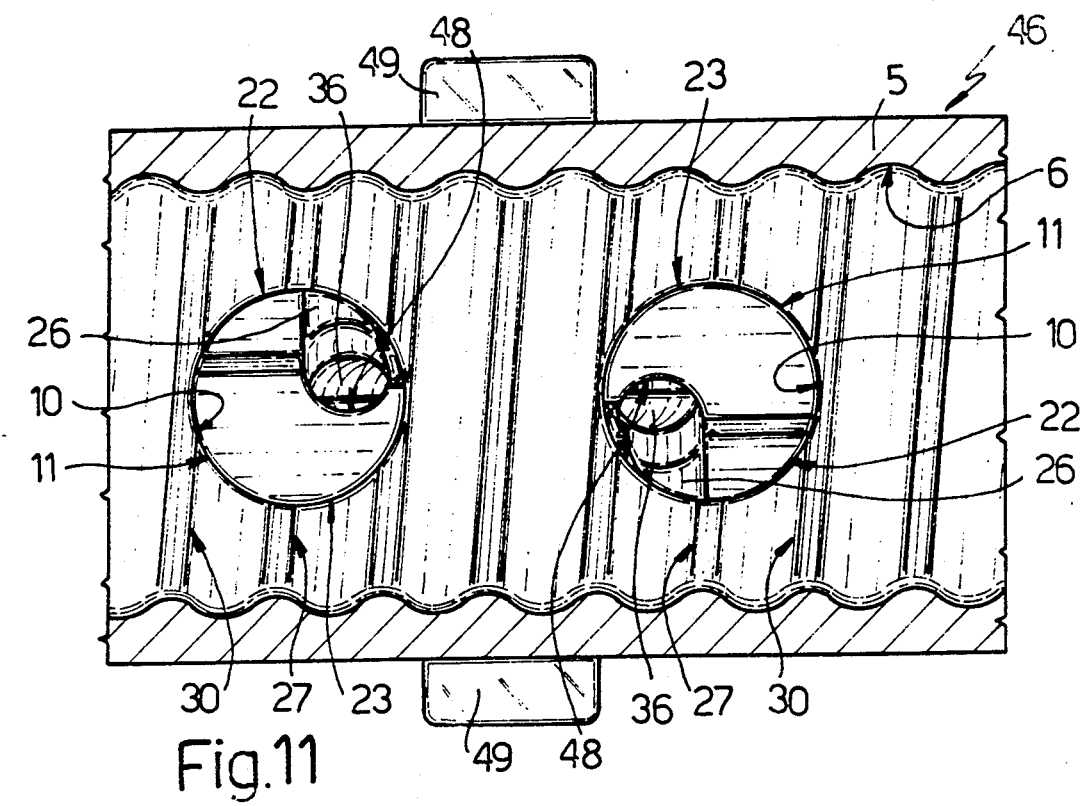
FIG. 11 shows a section similar to that of FIG. 2, but relative to a second embodiment of the coupling according to the present invention.
Figure 2:
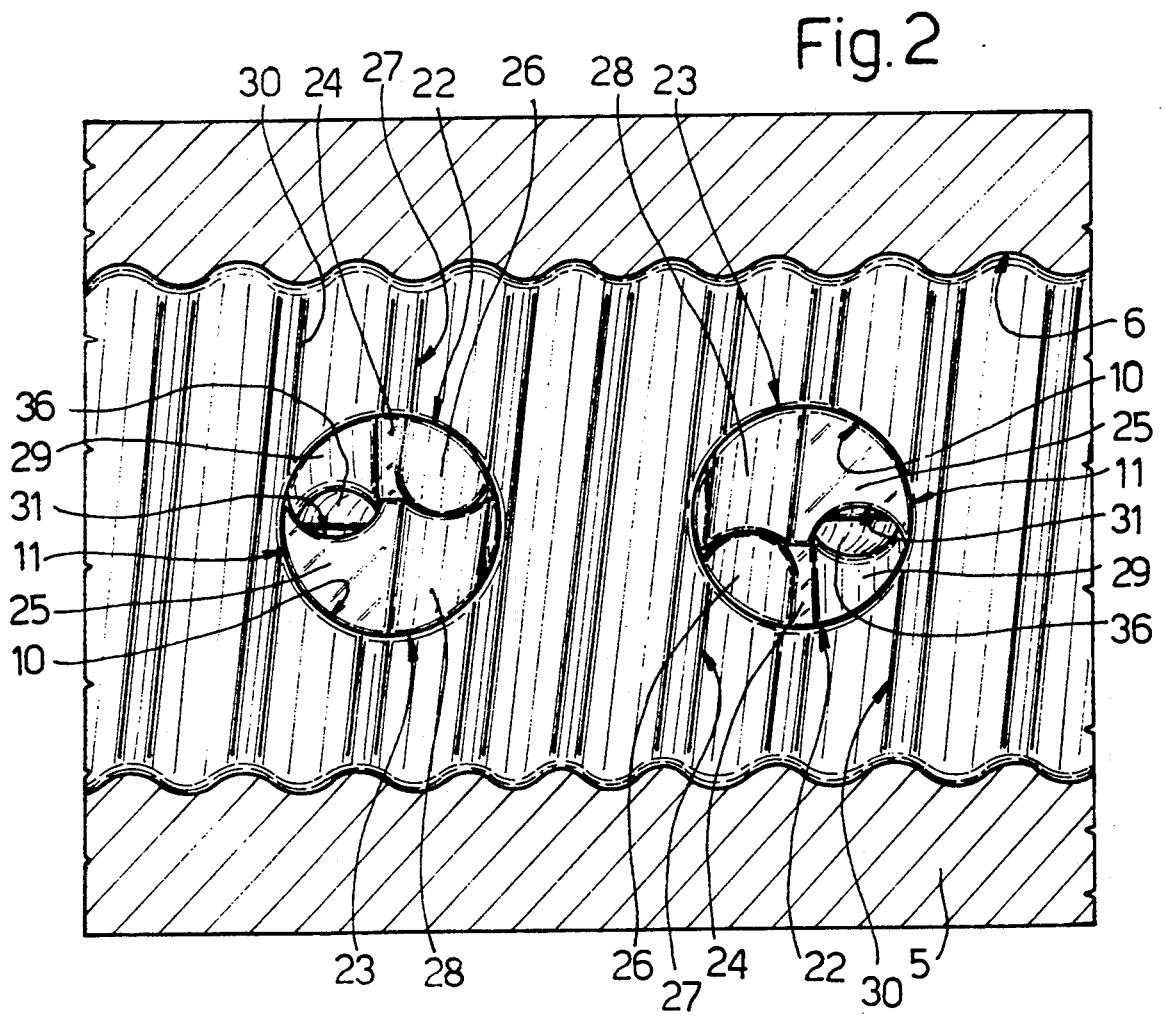
FIG. 2 shows a section along line II—II in FIG. 1.

Nut screw 5 presents at least a pair of substantially radial holes 10 (only one of which is shown in FIG. 1) formed along the same generating line of nut screw 5 and each having a diameter substantially equal to twice the diameter of helical track 8. Said pair of radial holes 10 are engaged by respective plugs 11, both integral with a U-shaped fastener 12 fitted outside nut screw 5 and consisting of a body substantially in the form of an elongated rectangular prism having its longitudinal axis parallel to the axis of nut screw 5. U-shaped fastener 12 is defined externally by a convex surface 13 substantially parallel to the outer surface of nut screw 5 and defined at its opposite ends by two ribs 14, each located at a respective hole 10. On the side facing nut screw 5, U-shaped fastener 12 is defined by a flat surface 15 contacting a flat faced portion 16 of nut screw 5, and from which plugs 11 extend perpendicularly.

Figure 4:
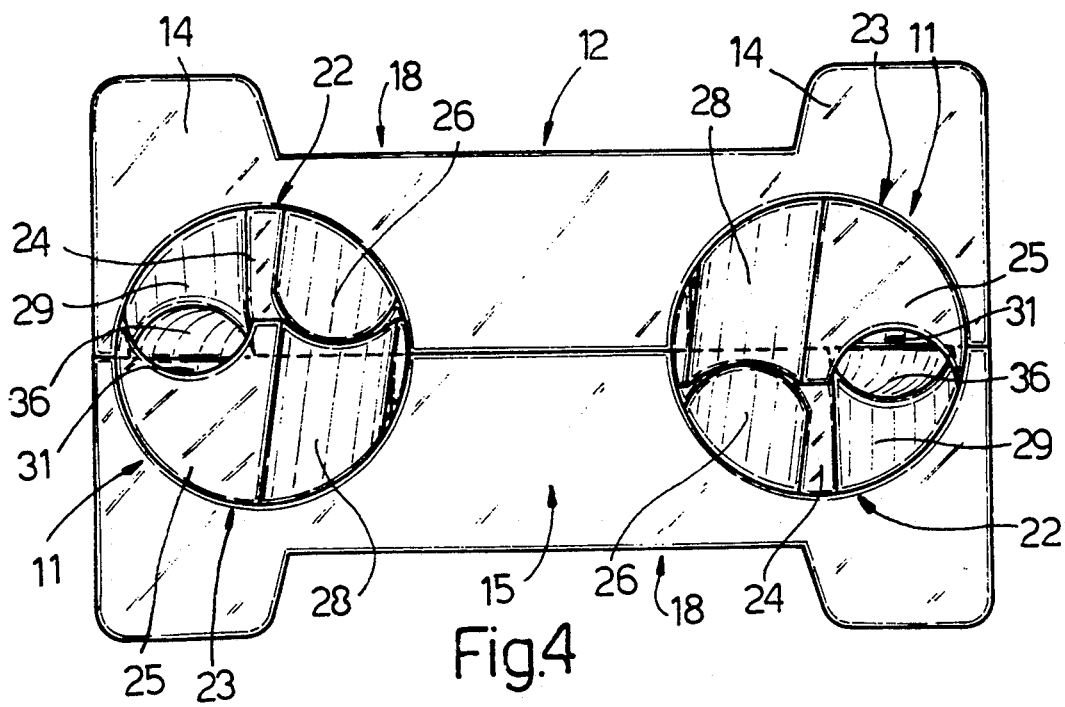
FIG. 4 shows a bottom plan view of the FIG. 3 detail.
Figure 3:
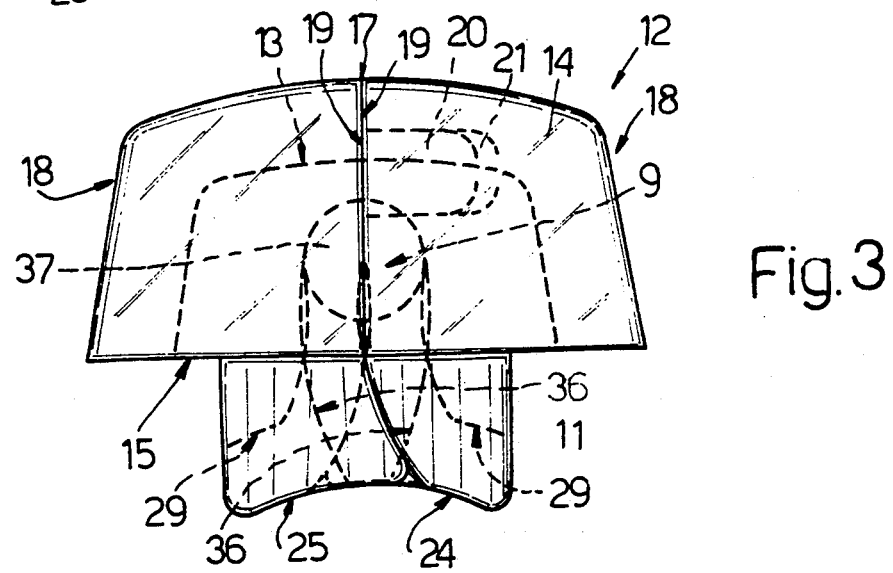
FIG. 3 shows a side view of a detail in FIG. 1.
Figure 6:
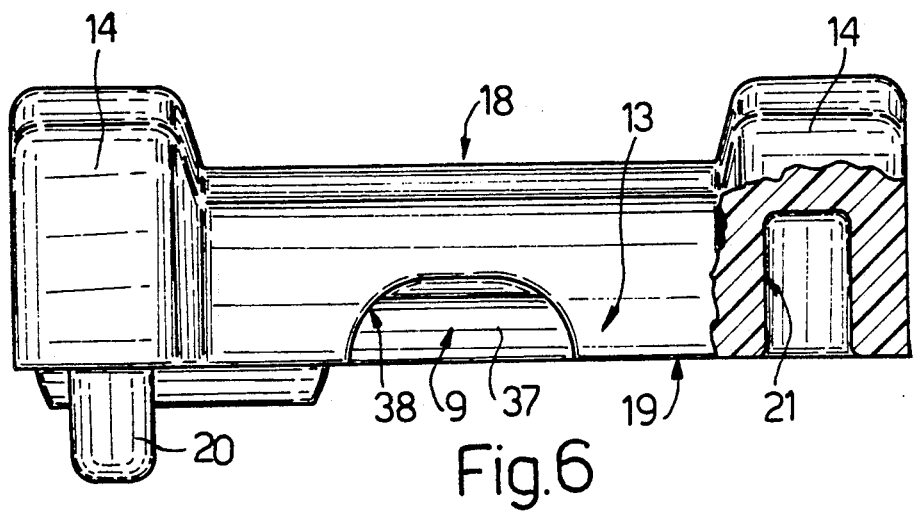
FIG. 6 shows a plan view of part of the FIG. 3 detail.
Figure 7:
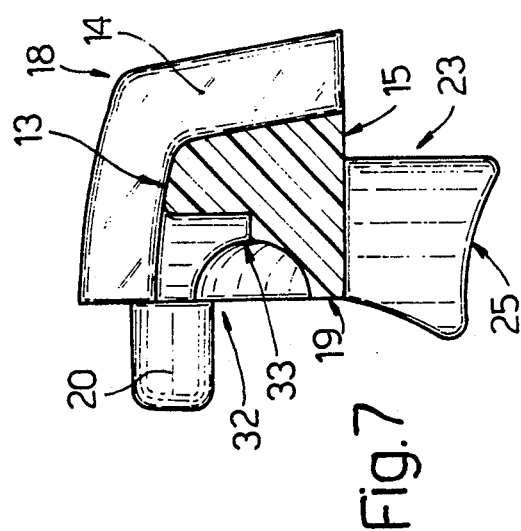
FIGS. 7 and 8 show respective sections along lines VII—VII and VIII—VIII in FIG. 5.
Figure 8:
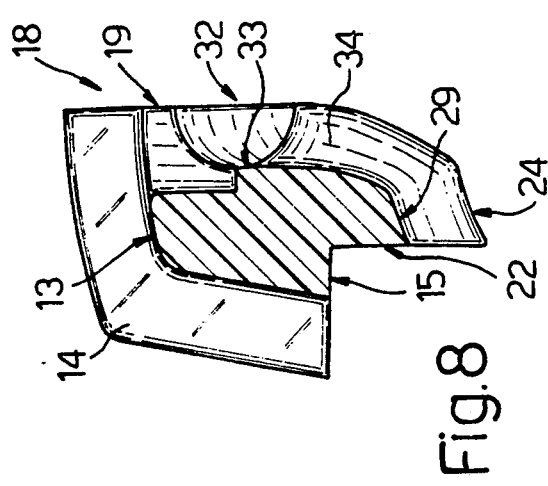
Figure 5:
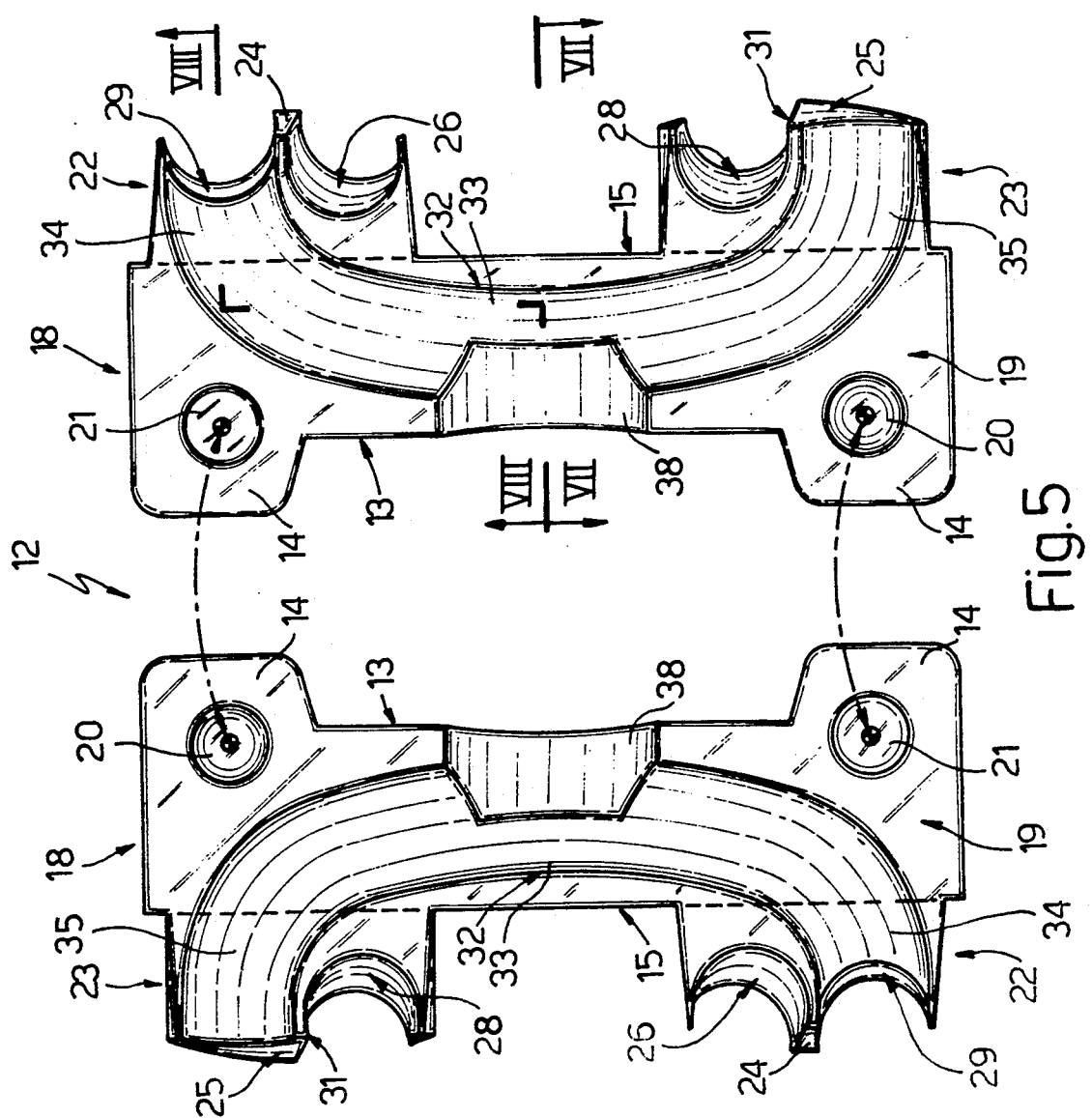
FIG. 5 shows an exploded view of the FIG. 3 detail.
Figure 14:
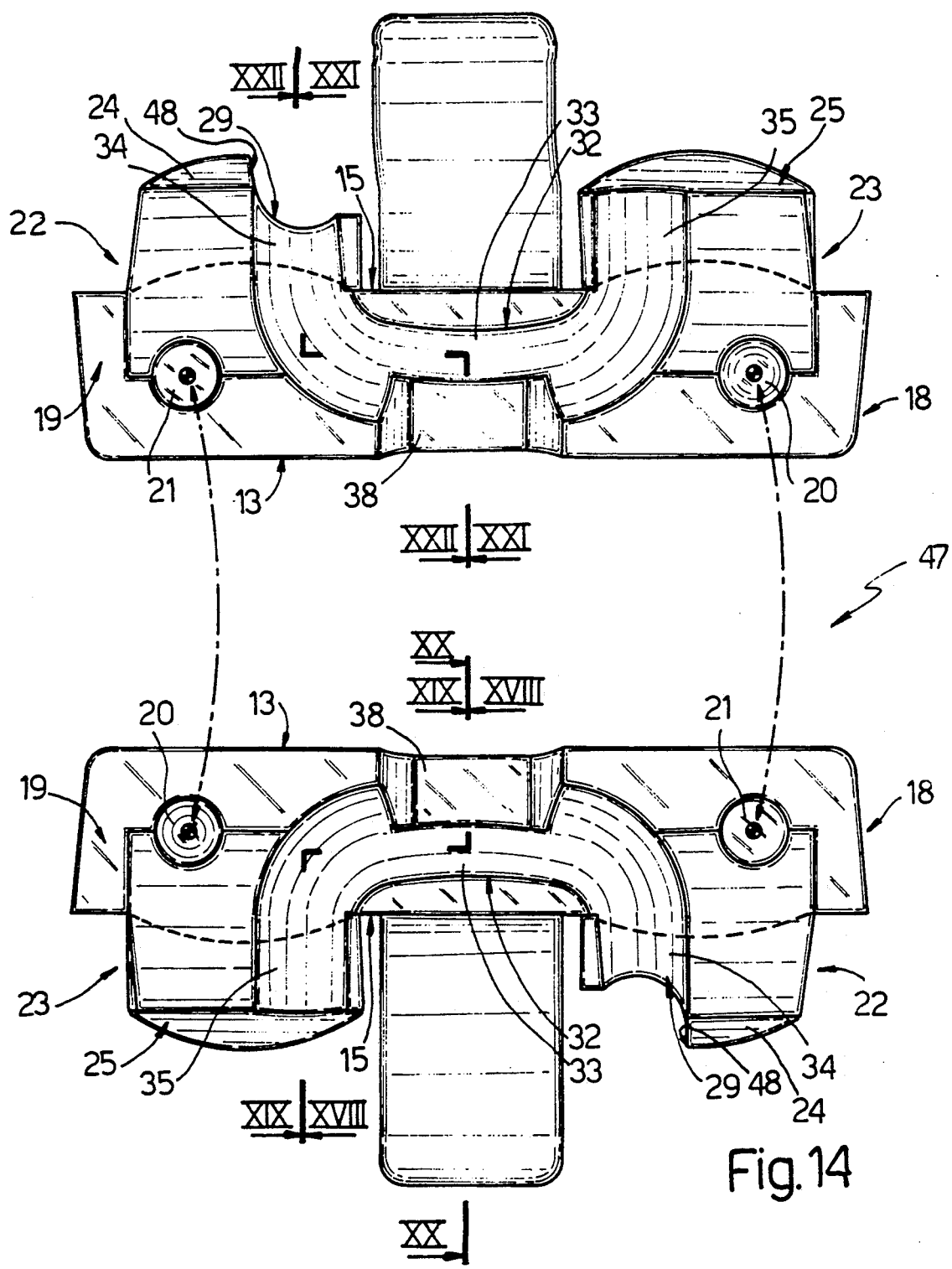
FIG. 14 shows an exploded plan view of the FIG. 13 detail.
Figure 15:
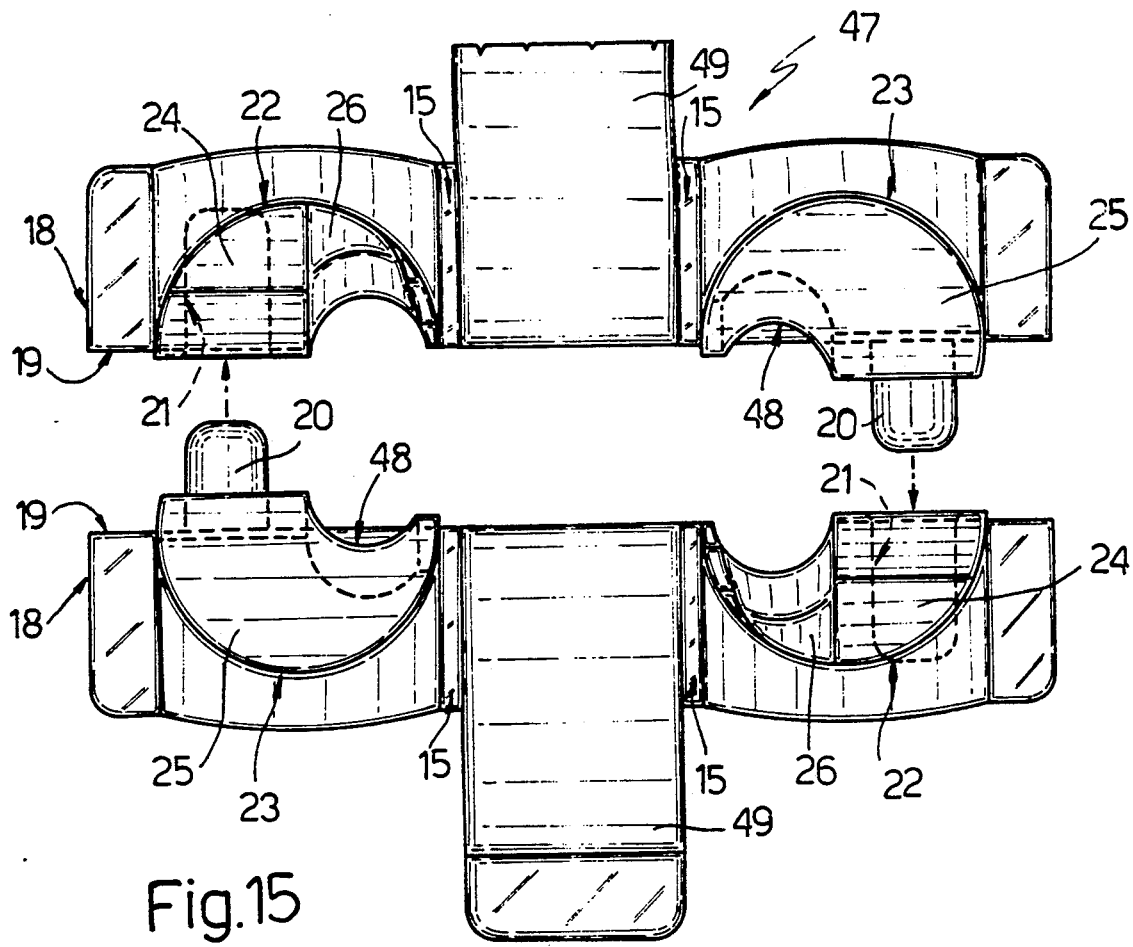
FIG. 15 shows an exploded bottom plan view of the FIG. 13 detail.
Figure 17:
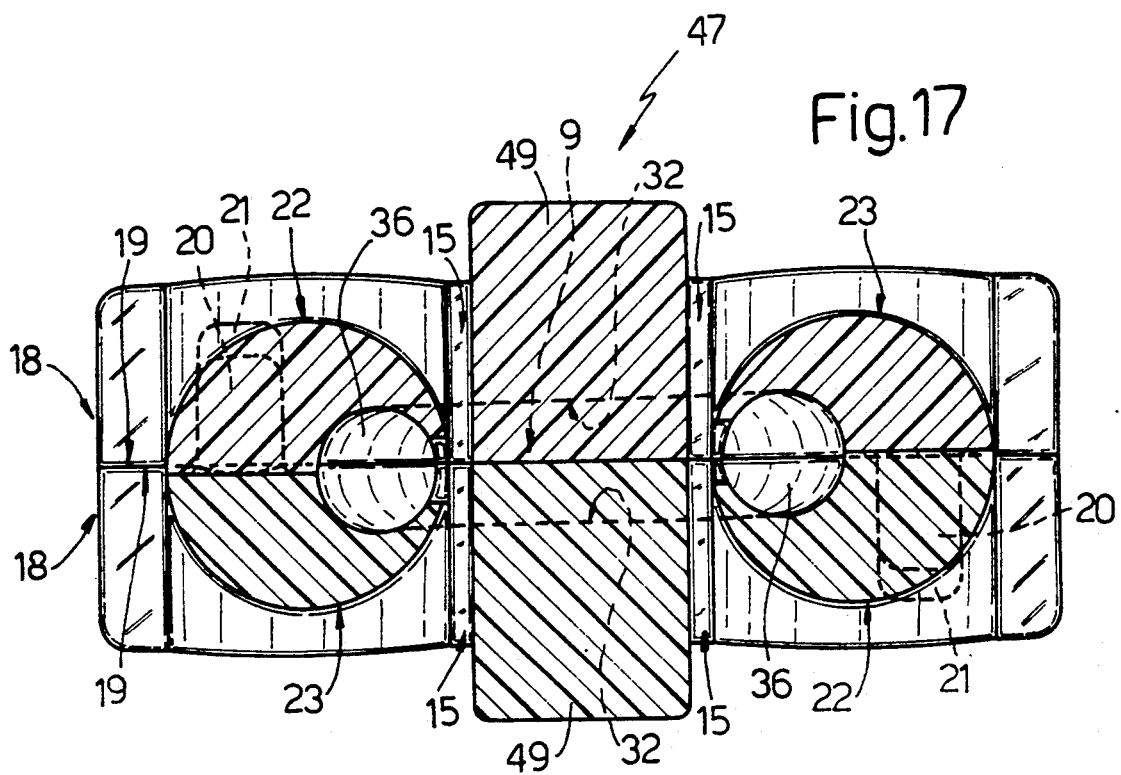
FIG. 17 shows a section along line XVII—XVII in FIG. 12.

As shown, particularly in FIGS. 3, 4 and 5, U-shaped fastener 12 is divided, by an axial slit 17 through the axis of plugs 11, into two identical, connected bodies 18. Along slit 17, each of bodies 18 presents a flat surface 19 having, on one side, a pin 20 perpendicular to surface 19 and located on a first of said ribs 14, and, on the other, a dead hole 21 located on the other of said ribs 14 and designed to receive a pin 20 in slightly force-fit manner.

When said bodies 18 are fitted together with respective surfaces 19 contacting each other, pin 20 of each body 18 engages hole 21 on the other (FIG. 5) so as to render said bodies 18 integral with each other and so form U-shaped fastener 12.

As already stated, slit 17 divides each plug 11 diametrically into two half plugs 22, 23 defined at their respective free ends by respective semicircular surfaces 24, 25 coplanar to the inner surface of hole 4 on which groove 6 is formed. On a first inner portion of surface 24 of each half plug 22 facing the other plug 11, a groove portion 26 is formed constituting a continuation of turn 27 of groove 6 interrupted by hole 10. On a corresponding inner portion of each surface 25 of half plugs 23, a further groove portion 28 is formed constituting a continuation of turn 27 and corresponding portion 26. Each pair of adjacent portions 26 and 28 thus provide for maintaining the continuity of turn 27 across respective hole 10. On an outer portion of each surface 24, a groove portion 29 is formed parallel to respective portion 26 and constituting a continuation of turn 30 of groove 6 interrupted by hole 10 and located outwards of and adjacent to respective turn 27. By virtue of portions 29, the outer end portions of respective half plugs 23 define two projections 31 interrupting the continuity of respective turns 30 and defining the opposite ends of track 8.

As shown, particularly in FIG. 5, contacting surfaces 19 present respective substantially U-shaped grooves 32 having their respective concave sides facing nut screw 5 and defining recirculating channel 9. In more detail, each groove 32 comprises an intermediate portion 33 extending along U-shaped fastener 12, and two end portions 34, 35 extending along half plugs 22, 23 and terminating respectively at the end of groove portion 26 and the end of projection 31.

Together with the respective end portion 35 extending inside plug 11, each end portion 34 defines a hole 36 communicating with track 8 and constituting an end portion of recirculating channel 9. As shown, particularly in FIGS. 1 and 3, said holes 36 slope in opposite directions in relation to the plane of slit 17, so as to blend track 8 smoothly with an intermediate portion 37 of recirculating channel 9 defined by portions 33 of mating grooves 32.

Through surface 13 of U-shaped fastener 12, and halfway between ribs 14, a substantially radial hole 38 is formed for enabling external communication of intermediate portion 37 of recirculating channel 9, and constituting a radial hole for loading balls 7. As shown in FIG. 1, U-shaped fastener 12 is fitted externally with a substantially U-shaped cover 39 having its concave side facing nut screw 5, and comprising a center portion 40 between ribs 14, contacting surface 13 and having a central inner appendix constituting a removable plug 41 for hole 38.

As shown in FIGS. 1 and 10, on the free end surface of plug 41, there is formed a groove portion 42 cooperating with intermediate portions 33 of grooves 32 so as to define intermediate portion 37 of recirculating channel 9.

Cover 39 also comprises two opposite side arms 43 contacting the lateral surfaces of U-shaped fastener 12, and each having a flat end flange 44 held contacting faced portion 16 by a split retainer ring 45 about nut screw 5.

Clearly, therefore, after traveling along recirculating channel 9, balls 7 roll inside nut screw 5 through one of holes 36, and along the entire length of helical track 8 extending between the two end turns 30. In other words, on coupling 1 as described above, the length of track 8 is not limited to one turn (half each of turns 27 and 30) interrupted by hole 10, as on known couplings, but extends to all the turns between said two holes 36, as well as to the two end turns interrupted by holes 36 themselves.

FIGS. 11 to 22 show a coupling 46 similar to coupling 1 and the component parts of which are indicated, wherever possible, using the same numbering system.

Coupling 46 is a simplified version of coupling 1, wherein helical track 8 for balls 7 extends solely to the turns between holes 36, and not, as in the former case, to the two end turns interrupted by holes 10. Coupling 46 comprises a U-shaped fastener 47, which differs from fastener 12 on coupling 1 by virtue of the groove portion on the end surface of each of plugs 11 consisting of groove portion 26 of respective half plug 22, while the two half plugs 23 define two projections 48 interrupting respective turns 27.

Holes 36 on U-shaped fastener 47 obviously come out at the ends of respective groove portions 36.

Figure 12:
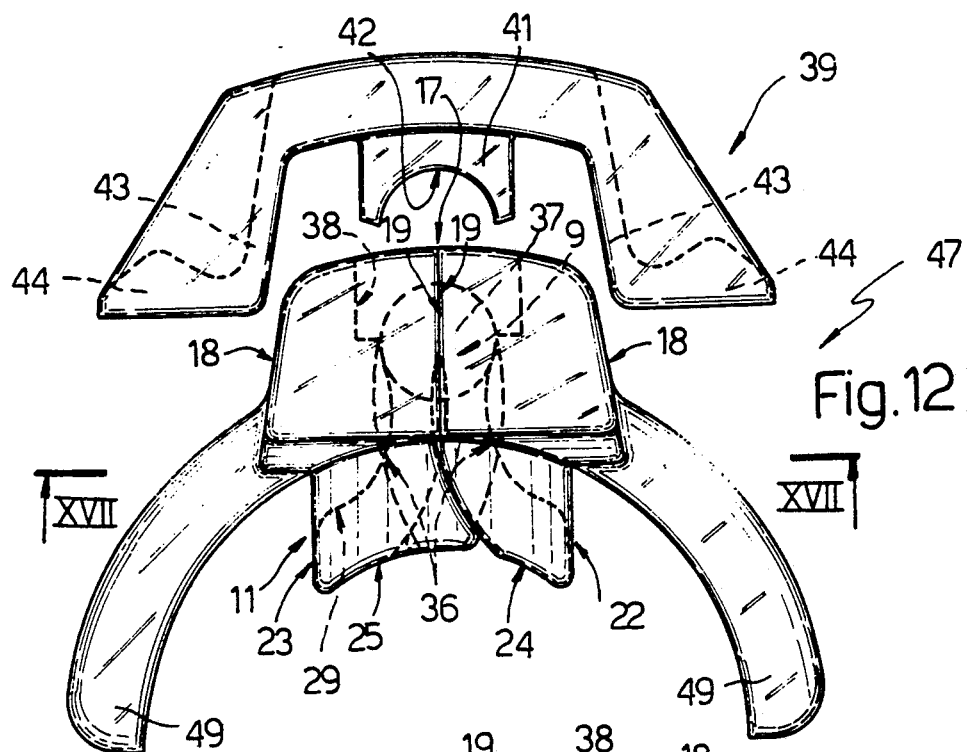
FIG. 12 shows a partially-exploded side view of a detail in FIG. 11.
Figure 18:
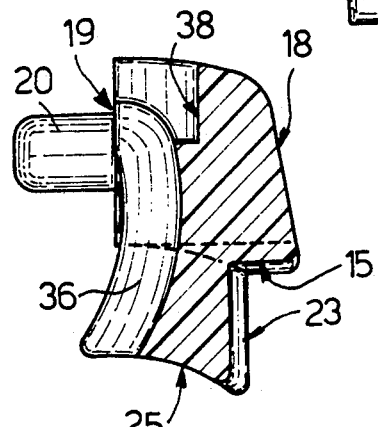
Figure 22:
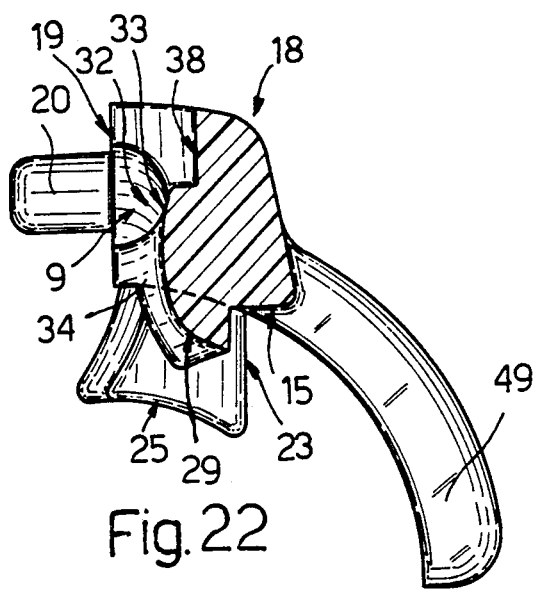
Figure 20:
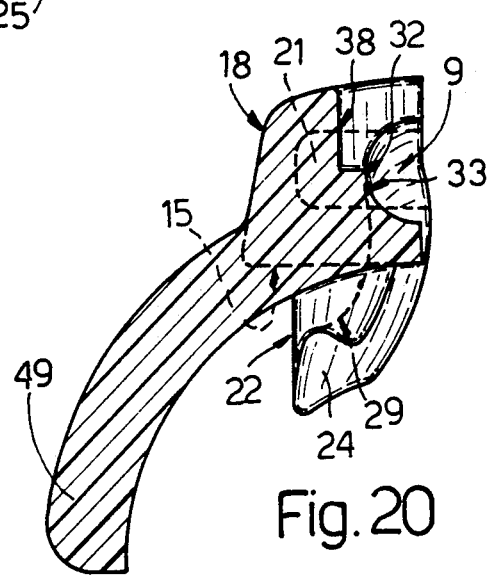

As shown, particularly in FIG. 12, U-shaped fastener 47 is secured directly on to nut screw 5 and not, as in the case of fastener 12, via the interposition of cover 39. For this purpose, a wing 49 extends outwards from each body 18 of U-shaped fastener 47, and is snapped about a portion of nut screw 5 for securing U-shaped fastener 47 firmly to the same.

Numerous systems may obviously be employed for securing U-shaped fasteners 12 and 47 to nut screw 5, and for closing ball loading hole 38. The systems described in connection with coupling 1 may also be employed on coupling 46 and vice versa.

I claim:

1. A recirculating ball screw-nut screw coupling, comprising:
    (a) a screw including a first helical groove formed on the outer surface thereof;
    (b) a screw-nut including a second helical groove formed on the inner surface thereof and coaxial with said screw;
    (c) said first and second helical grooves defining a helical track;
    (d) a plurality of balls mounted between said screw and said screw-nut in such a manner as to roll along said helical track;
    (e) said screw-nut having at least a pair of substantially radial holes axially spaced from each other for defining therebetween a length of said helical track;
    (f) each of said holes having a diameter equal to at least twice the width of said helical track so as to intersect within each of said holes adjacent outer and inner turns of said second helical groove;
    (g) a longitudinal member extending outside said screw-nut and including a plug disposed at opposite ends thereof;
    (h) each of said plugs being disposed within each of said radial holes, respectively;
    (i) said member including a recirculating channel extending therethrough and connecting the ends of said length of said helical track;
    (j) each of said plugs including a hole forming a respective end portion of said recirculating channel; and
    (k) each of said plug holes communicating with one of said inner and outer adjacent turns such that said balls are diverted to said recirculating channel for return to said length of said helical track when said balls reach the end of said length of said helical track.

2. A coupling as in claim 1, wherein:
    (a) each of said plug holes communicates with said inner turn of said second helical groove.

3. A coupling as in claim 1, wherein:
    (a) each of said plug holes communicates with said outer turn of said second helical groove; and
    (b) each of said plugs includes a groove portion for maintaining the continuity of said inner turn therethrough.

4. A coupling as in claim 1, wherein:
    (a) said plug holes slope in opposite directions so as to blend said helical track into said recirculating channel.

5. A coupling as in claim 1, wherein:
    (a) each of said plugs includes a portion projecting into one of said inner and outer turns.

6. A coupling as in claim 1, wherein:
    (a) said member includes a hole communicating with said recirculating channel adapted for loading said balls into said channel; and
    (b) said member including a removable cover means for providing access to said loading hole.

7. A coupling as in claim 6, wherein:
    (a) said loading hole is substantially transverse to an intermediate portion of said recirculating channel.

8. A coupling as in claim 6, and including:
    (a) means for securing said cover means and said member to said screw-nut.

9. A coupling as in claim 8, wherein:
    (a) said securing means is operably associated with said screw-nut and said cover means.

10. A coupling as in claim 1, wherein:
    (a) said member comprises two identical bodies having opposing contacting surfaces forming an imaginary dividing surface; and
    (b) means for joining said bodies together.

11. A coupling as in claim 10, wherein:
    (a) said joining means includes a pin disposed on each of said opposing surfaces and a cooperating hole disposed in the corresponding opposing surface; and
    (b) said pin and said cooperating hole are sized for a forced fit.

12. A coupling as in claim 11, wherein:
    (a) said opposing surfaces include flat portions; and
    (b) said pin and said cooperating hole are disposed on said flat portions.

13. A coupling as in claim 10, wherein:
    (a) said dividing surface splits said recirculating channel into two identical grooves.

14. A coupling as in claim 1, and including:
    (a) means operably associated with said screw-nut and said member for securing said member to said screw-nut.

15. A coupling as in claim 14, wherein:
    (a) said securing means includes a split retainer ring.

* * * * *